Jan. 4, 1949.  C. C. LAURITSEN ET AL  2,458,476
ROCKET LAUNCHER
Filed Jan. 4, 1946  3 Sheets-Sheet 1

INVENTORS
HELEN C. McMORRIS, Administratrix for
JOHN McMORRIS, Deceased and CHARLES C. LAURITSEN
BY
ATTORNEY Jan. 4, 1949.  C. C. LAURITSEN ET AL  2,458,476
ROCKET LAUNCHER
Filed Jan. 4, 1946  3 Sheets-Sheet 2
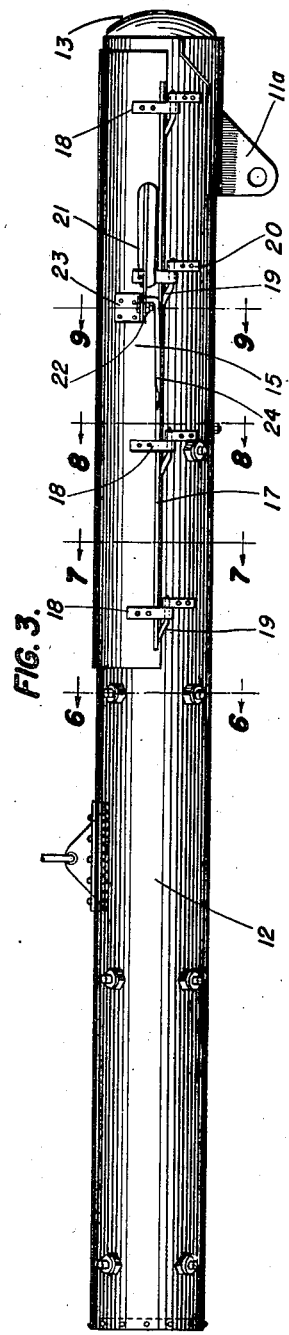
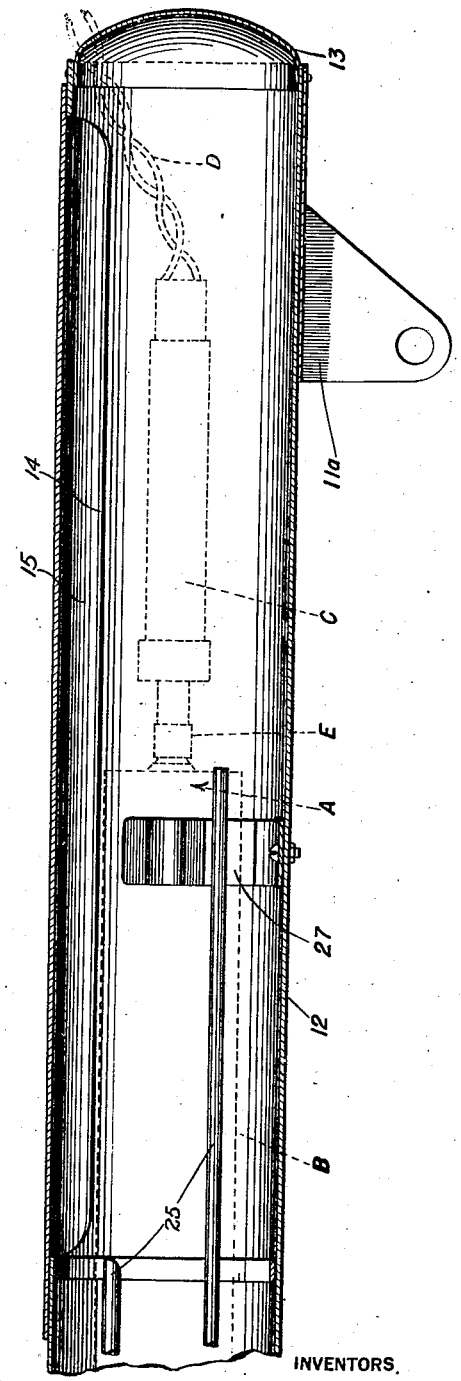
INVENTORS.
HELEN C. M<sup>c</sup>MORRIS, Administratrix for
JOHN M<sup>c</sup>MORRIS, Deceased and CHARLES C. LAURITSEN
BY
ATTORNEY

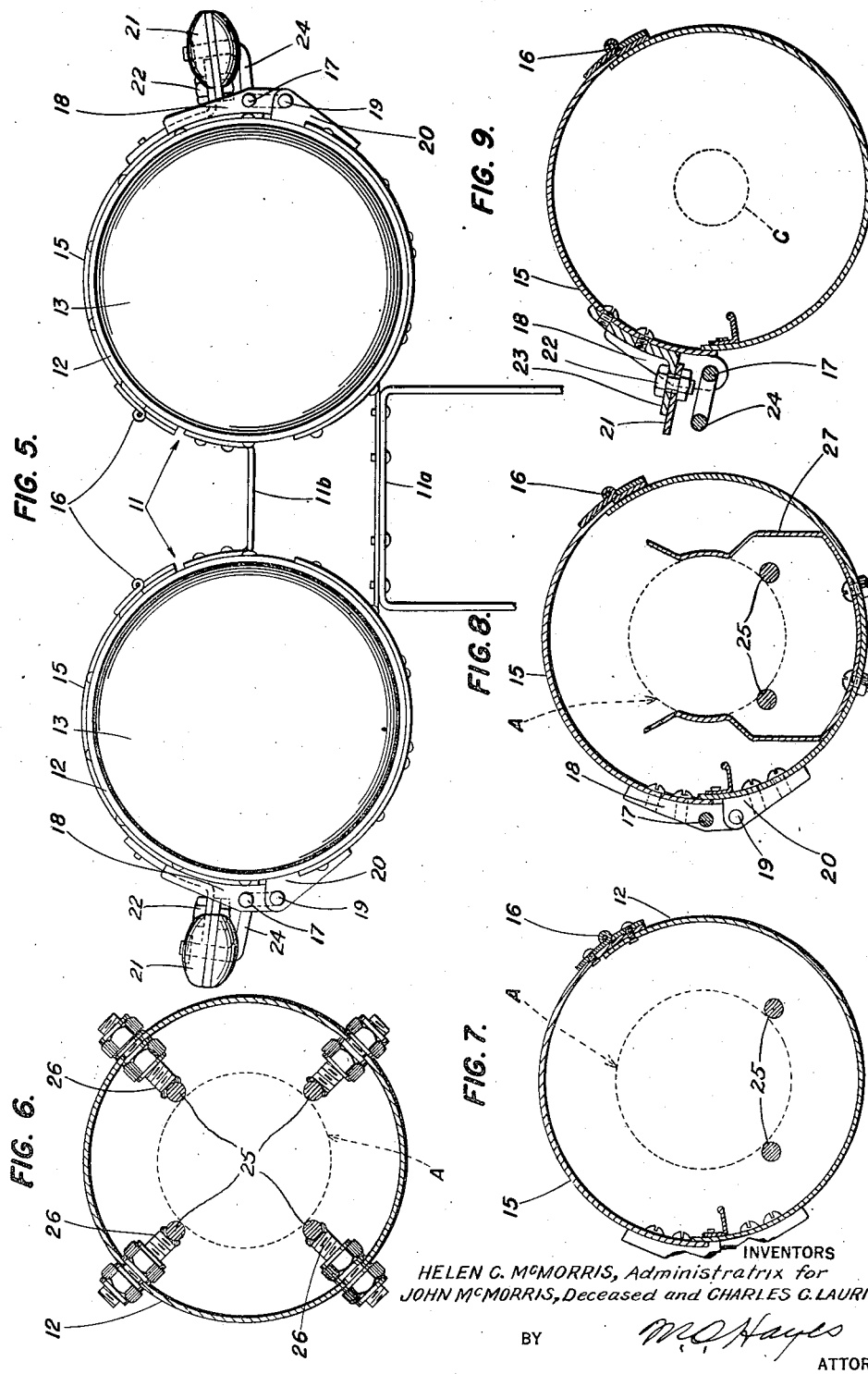

Patented Jan. 4, 1949

2,458,476

UNITED STATES PATENT OFFICE 2,458,476

ROCKET LAUNCHER

Charles C. Lauritsen, Pasadena, Calif., and John McMorris, deceased, late of Pasadena, Calif., by Helen C. McMorris administratrix, Pasadena, Calif., assignors to the United States of America as represented by the Secretary of the Navy Application January 4, 1946, Serial No. 639,084

4 Claims. (Cl. 89—1.7)

This invention relates to launchers for rocket devices, and more particularly to a novel reloadable launcher for use from the interior of an airplane or other vehicle.

One object of the invention is to provide a launcher for rocket devices which is closed except for its discharge end and is adapted for mounting within an airplane or other vehicle with only its discharge or muzzle end protruding, thus permitting loading, servicing and firing from within the vehicle.

Another object of the invention is to provide a launcher for rocket devices which, although closed except for its discharge end, is so constructed that no appreciable reaction force is exerted in a manner which would burst the projector or stress the mountings, whereby the projector is correspondingly light in weight and requires a minimum amount of support. This feature also facilitates use of the device on airplanes where appreciable reaction forces on firing would be undesirable.

Another object of the invention is to provide a launcher which is particularly adapted for the retro-launching of rocket propelled floatlights of the type disclosed in a patent application of Charles C. Lauritsen and John McMorris, Serial No. 481,652, filed April 2, 1943. The launcher is not limited in use to such devices or to the retro-operation, however, and may be used with any rocket propelled devices for forward or retro-operation.

These and other objects of the invention will be apparent from the following specification and the accompanying drawings, in which:

Fig. 3 is a side elevational view of the launcher;

Fig. 4 is a fragmentary longitudinal sectional view of the launcher;

Fig. 5 is an end elevational view of the launchers shown in Fig. 1; and

Figure 1:
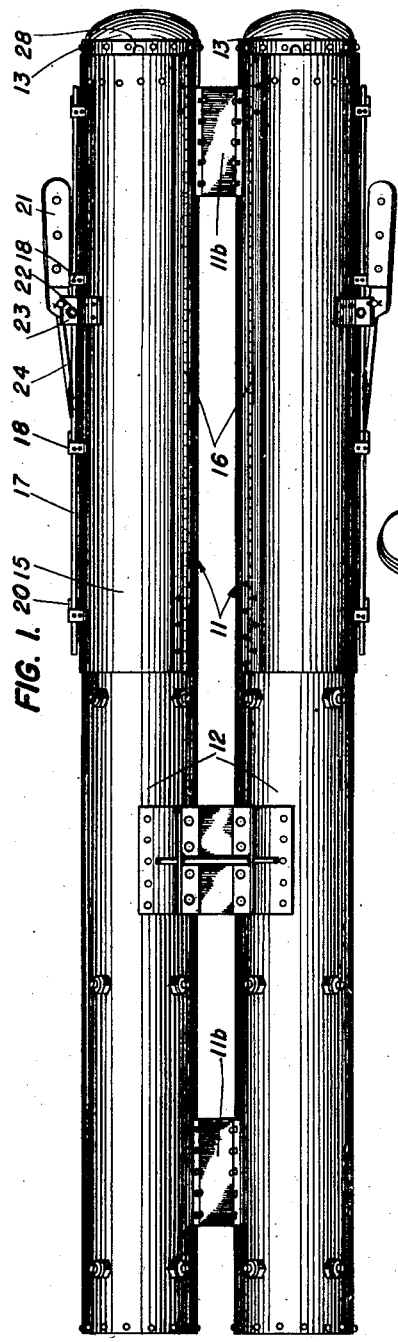
Fig. 1 is a plan view of a twin launcher for rocket devices, incorporating the present invention.

Figs. 6, 7, 8, and 9 are cross section views taken on lines 6—6, 7—7, 8—8, and 9—9, respectively, of Fig. 3.

In the accompanying illustrations, the launcher is shown as comprising two units 11 adapted to be mounted on an airplane or other vehicle by brackets 11a. The two units are identical, except that they have right and left symmetry about an intermediate longitudinal axis, and the units are interconnected by cross members 11b. Each launcher unit comprises a cylindrical tube 12 of uniform diameter open at one end and closed at the other by a dome shaped end member 13.

Figure 2:
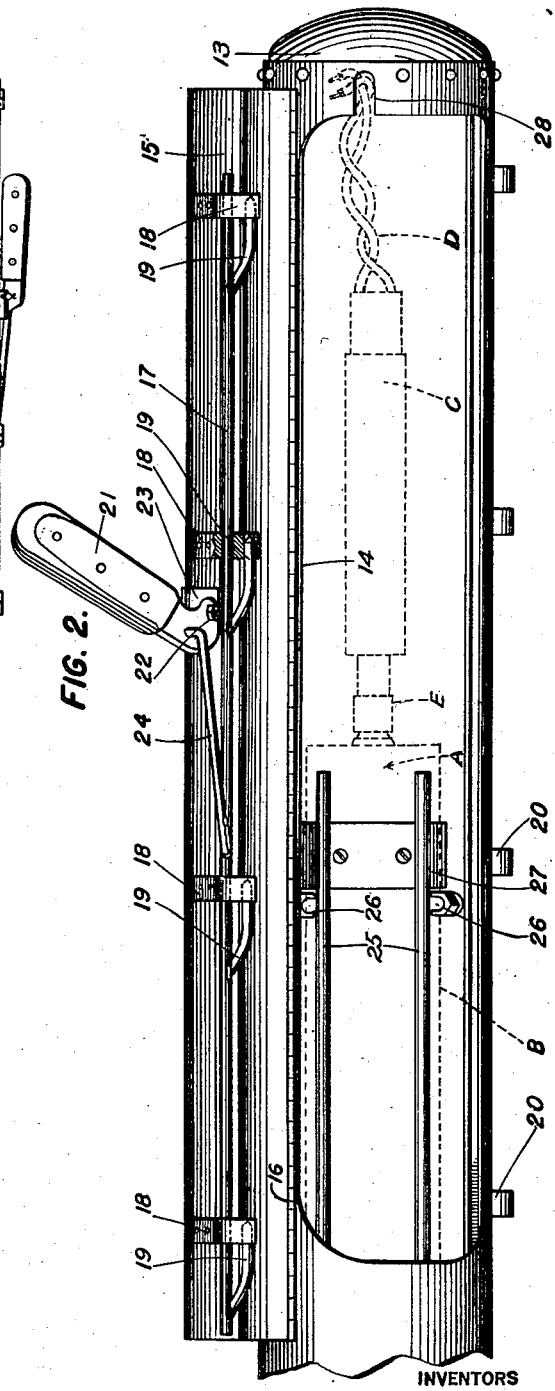
Fig. 2 is a fragmentary plan view of the breech end of the launcher with the loading door open.

Adjacent the closed end of each tube 12 is an opening 14 occupying almost half the periphery of the tube and extending a substantial proportion of its length. The opening 14 is adapted to receive a rocket device A, shown by dotted lines in Figs. 2, 4, 6, 7 and 8. The rocket device here illustrated comprises a floatlight or other projectile B, a rocket motor C having lead wires D for firing the rocket, and a separable connecting means E between the rocket motor and the floatlight. The rocket device is more fully illustrated in the copending application Serial No. 481,652 referred to hereinbefore.

The opening 14 is closed by a door 15 which is curved into conformity with the side wall of tube 12. The door 15 overlaps the margins of the opening 14 and is attached along one side by a hinge 16.

The door is secured in its closed position by a latching arrangement which includes a longitudinally slidable bar 17 extending the length of the door along its free margin and guided by several spaced guide lugs 18. Several latch pins 19 are secured to the bar and extend angularly outwardly from and then parallel with the bar, the pins being pointed at their free extremities. Each guide lug 18 is adapted to receive the free end portion of one of the latch pins 19 in an opening parallel to the hole which receives the bar 17. Mounted on the tube 12 are lugs 20 which have holes in their extremities adapted to register with and receive the free end portions of the latch pins 19 when the door 15 is closed.

A handle 21 is pivotally connected to the door 15 by means of a journal bolt 22 and mounting bracket 23. The handle is likewise pivotally connected to the extremity of an arm 24 secured to the slide bar 17. The arm is flexible enough to permit the pivotal movement of the handle 21 about the journal bolt 22 necessary to move bar 17 longitudinally and thereby effect the latching and unlatching movement of the latching pins 19. The location of the points of connection between the handle 21, journal bolt 22 and arm 24, and the spring action of the arm, are such that the handle is in an over-center position when the latching pins are in their fully released or fully locked positions.

Within each tube 12 are four longitudinally extending rails 25 spaced equally from the center or axis of the tube by inwardly extending support posts 26 mounted on the side wall of the tube. Two of the rails terminate at the forward end of opening 14 while the other two continue about half the length of the opening as shown in Fig. 4.

A U-shaped spring clip member 27 is secured to the tube near the extremities of the longer rails. The clip member is adapted to receive the rocket device when inserted through the opening 14 and placed on the rails, and serves to hold the rocket device in proper position until fired. A small notch 28 is provided in the margin of the opening 14 to accommodate the lead wires from the rocket motor when the door 15 is closed.

The diameter of the tube 12 is materially greater than the diameter of the rocket device, thereby providing a large area between the tube and the rocket device to permit the escape of gases forwardly around the rocket device, and to minimize end thrust on the tube 12 and its mounting.

In practice, the units 11 in any desired number are mounted in an airplane or other vehicle so as to project outwardly through the outer walls of the vehicle. When used with a rocket propelled floatlight, the tubes preferably extend rearwardly for retro-operation and the proportional sizes of floatlight and rocket motor are such that the floatlight is given a rearward thrust which approximates as closely as possible the forward flight velocity of the airplane so that the rocket device falls substantially vertically from its point of release. Thus a spot over which the airplane passed, at the instant the rocket was actuated, may be marked.

By providing a launcher tube which is closed at its rear end, the rocket blast is prevented from reaching the interior of the vehicle, and the spacing provided between the rocket device and the tube permits the blast from the rocket to be deflected forwardly by the end member 13 and out of the muzzle of the launcher.

It should be noted that the launcher is not limited in use to retro-operation or to use with floatlights but may be advantageously utilized with other types of rocket propelled devices and may be used for other than retro-operation. It is to be understood that the invention is not to be limited or restricted to the details set forth above, since these may be modified within the scope of the appended claims without departing from the spirit and scope of the invention.

It is claimed:

1. A rocket launcher comprising a tube closed at one end and open at the opposite end, the tube having an opening in its side wall for inserting a rocket into the tube, launching guide rails within said tube for receiving a rocket from said side opening, and a movable cover on the tube for covering said side opening.

2. A rocket launcher comprising a tube open at one end and closed at the other end, launching guide rails in said tube and extending longitudinally of the tube for supporting a rocket, and supports for spacing said rails radially inwardly from the side walls of said tube whereby a rocket blast escape passage is provided around the rocket to said open end.

3. A rocket launcher comprising a tube closed at its breech end and open at its muzzle end and having a side opening near its breech end, a door for covering said opening, means for latching said door in place over said opening, rocket guiding means in said tube, and means for spacing said guiding means radially inwardly from the side walls of the tube to define a rocket blast escape passage between the rocket and the tube.

4. A rocket launcher comprising a tube open at one end and closed at the other end, the tube having near said closed end a side opening for inserting a rocket, guide rails mounted in the tube for receiving a rocket from said side opening and providing at least a three point support for the rocket, a spring clip in the tube for clamping the side wall of a rocket therein to hold the rocket against longitudinal displacement in the tube, and a movable cover on the tube for closing said side opening.

CHARLES C. LAURITSEN.
HELEN C. McMORRIS,
Administratrix of the Estate of John McMorris, Deceased.

REFERENCES CITED

The following references are of record in the file of this patent:

UNITED STATES PATENTS

| Number | Name | Date |
|---|---|---|
| 455,279 | Cunningham | June 30, 1891 |
| 1,045,075 | Pompili | Nov. 19, 1912 |
| 1,314,801 | Hanzlik | Sept. 2, 1919 |
| 1,349,414 | Dougan | Aug. 10, 1920 |
| 1,661,091 | Riabonchinski | Feb. 28, 1928 |
| 1,803,366 | Stetson | May 5, 1931 |

FOREIGN PATENTS

| Number | Country | Date |
|---|---|---|
| 25,326 | Great Britain | 1894 |
| 212,873 | Switzerland | Mar. 17, 1941 |